(12) United States Patent
Dong et al.

(10) Patent No.: US 10,097,378 B2
(45) Date of Patent: Oct. 9, 2018

(54) EFFICIENT TCAM RESOURCE SHARING

(75) Inventors: Xuanming Dong, Cupertino, CA (US);
Vijaya Kumar Kulkarni, Bangalore (IN); Cesare Cantù, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 13/607,229

(22) Filed: Sep. 7, 2012

(65) Prior Publication Data

US 2014/0075108 A1 Mar. 13, 2014

(51) Int. Cl.
*G06F 12/00* (2006.01)
*H04L 12/64* (2006.01)

(52) U.S. Cl.
CPC ................ *H04L 12/6418* (2013.01)

(58) Field of Classification Search
CPC ......... G06F 12/00; G06F 17/00; H04L 12/00; H04L 12/6418
See application file for complete search history.

(56) References Cited

U.S. PATENT DOCUMENTS

| | | | |
|---|---|---|---|
| 7,680,978 B1 * | 3/2010 | Narayan | G06F 12/0811 711/108 |
| 7,933,282 B1 * | 4/2011 | Gupta | G06F 17/30982 370/412 |
| 8,909,857 B2 * | 12/2014 | Reddy | H04L 49/25 365/49.1 |
| 2006/0262583 A1 * | 11/2006 | Venkatachary | G11C 15/00 365/49.17 |
| 2012/0137060 A1 * | 5/2012 | Akerib | G11C 15/00 711/105 |

OTHER PUBLICATIONS

DPPC-RE: TCAM-Based Distributed Parallel Packet Classification with Range Encoding, Kai Zheng, Hao Che, Zhijun Wang, Bin Liu and Xin Zhang. IEEE Transactions on Computers, vol. 55, No. 8, Aug. 2006. pp. 948-959.*
DPPC-RE: TCAM-Based Distributed Parallel Packet Classification with Range Encoding. IEEE Transactions on Computers, vol. 55, No. 8, Aug. 2006. Kai Zheng, Student Member, IEEE, Hao Che, Member, IEEE, Zhijun Wang, Bin Liu, Member, IEEE, and Xin Zhang.*

\* cited by examiner

*Primary Examiner* — David X Yi
*Assistant Examiner* — Tahilba Puche (57) ABSTRACT

Various systems and methods for implementing efficient TCAM resource sharing are described herein. Entries are allocated across a plurality of ternary content addressable memories (TCAMs), with the plurality of TCAMs including a primary TCAM and a secondary TCAM, where the entries are allocated by sequentially accessing a plurality of groups of value-mask-result (VMR) entries, with each group having at least one VMR entry associated with the group, and iteratively analyzing the VMR entries associated with each group to determine a result set of VMR entries, with the result set being a subset of VMR entries from the plurality of groups of VMR entries, and the result set to be stored in the primary TCAM.

21 Claims, 11 Drawing Sheets

```
1  TOTAL_TCAM_CLIENT    /*
2                        * total number of available TCAM entries
3                        * in Client Line Card.
4                        */
5  TOTAL_TCAM_PROXY     /*
6                        * total number of available TCAM entries
7                        * in Proxy Line Card or SUP.
8                        */
9  NUM_VMR_LABEL_1      /* total number of VMRs to program label 1 */
10 NUM_VMR_LABEL_2      /* total number of VMRs to program label 2 */
11 ...
12 NUM_VMR_LABEL_N      /* total number of VMRs to program label N */
13 MAX_NUM_VMR_LABEL = max {NUM_VMR_LABEL_1,
14                          NUM_VMR_LABEL_2,
15                          ...,
16                          NUM_VMR_LABEL_N}
17
18 uint16_t max_vmr_lbl[MAX_LABEL] =   [NUM_VMR_LABEL_1,
19                                      NUM_VMR_LABEL_2,
20                                      ...,
21                                      NUM_VMR_LABEL_N];
22         /* total number of VMRs required for each label */
23 uint16_t lbl_idx;
24         /*
25          * loop index variable for label space that is
26          * continuous from 0 to MAX_LABEL-1.
27          */
28 uint16_t tcam_idx;
29         /*
30          * loop index variable for TCAM space that is
31          * continuous from 0 to TOTAL_TCAM_CLIENT.
32          */
33 uint16_t vmr_idx;  /* local variable for index loop. */
34
35 uint16_t cur_vmr_lbl_tcam;         /* temporary variable */
36 uint64_t tmp_stat;                 /* temporary variable */
37         /*
38          * the number of VMRs programmed for current label
39          * with current TCAM capacity.
40          */
41
```

*FIG. 6A*

```
42  uint64_t acl_stat[MAX_LABEL, MAX_NUM_VMR_LABEL+1];
43              /*
44               * acl_stat[i,j] is the ACL statistics for the "j"th
45               * VMR of label "i+1".
46               */
47  uint64_t acl_stat_ag[MAX_LABEL, MAX_NUM_VMR_LABEL+1];
48              /*
49               * acl_stat_ag[i,j] is the aggregate ACL statistics
50               * of the "j"th VMR and all preceding VMRs of the
51               * same label "i+1". acl_stat_ag[*,0]=0.
52               */
53  uint64_t obj_func[MAX_LABEL, TOTAL_TCAM_CLIENT+1];
54              /*
55               * obj_func[i,j] means the maximum objective function
56               * for the formulation in (1) if the there are total
57               * "i+1" labels and the capacity of Client LC TCAM
58               * entries is "j" entries.
59               */
60  uint64_t sol_lbl_tcam[MAX_LABEL, TOTAL_TCAM_CLIENT+1];
61              /*
62               * sol_lbl_tcam[i,j] is the number of VMRs programmed
63               * in Client LC TCAM for label "i+1" in case that the
64               * capacity of Client LC TCAM entries is "j", to
65               * maximize the objective function obj[i,j].
66               */
67  uint16_t sol_lbl_path[MAX_LABEL];
68              /*
69               * sol_lbl_path[i] stores the number of VMRs programmed
70               * in Client LC TCAM for label "i+1" in case that the
71               * Client LC TCAM capacity is TOTAL_TCAM_CLIENT, in
72               * order to achieve the best system performance.
73               *
74               * actually array sol_lbl_path[] stores all decision
75               * variables c_b s.
76               */
77
```

*FIG. 6B*

```
78  void calc_optimal_vmr_placement ()
79  {
80
81      /* initialize the aggregate statistics for each label */
82      for (lbl_idx=0; lbl_idx<MAX_LABEL; lbl_idx++) {
83          for (vmr_idx=1; vmr_idx<=max_vmr_lbl[lbl_idx]; vmr_idx++) {
84              acl_stat_ag[lbl_idx, vmr_idx] =
85                  acl_stat_ag[lbl_idx, vmr_idx-1]
86                      + acl_stat[lbl_idx, vmr_idx];
87          }
88      }
89
90      /* initialize the decision variables for stage 0 or label 1 */
91      lbl_idx = 0;
92      obj_func[lbl_idx, 0] = 0;
93      /* check all states */
94      for (tcam_idx=0; tcam_idx<=TOTAL_TCAM_CLIENT; tcam_idx++) {
95          cur_vmr_lbl_tcam = 0;
96          if (tcam_idx <= max_vmr_lbl[lbl_idx]) {
97              obj_func[lbl_idx, tcam_idx]
98                  = acl_stat_ag[lbl_idx, tcam_idx];
99              /*
100              * if client TCAM capacity is not enough, label 0
101              * take all entries.
102              */
103             cur_vmr_lbl_tcam = tcam_idx;
104         } else {
105             if (max_vmr_lbl[lbl_idx] > 0) {
106                 obj_func[lbl_idx, tcam_idx]
107                     = acl_stat_ag[lbl_idx, max_vmr_lbl[lbl_idx]];
108             }
109             cur_vmr_lbl_tcam = max_vmr_lbl[lbl_idx];
110         }
111         /* record the path */
112         sol_lbl_tcam[lbl_idx,tcam_idx]= cur_vmr_lbl_tcam;
113     }
114
```

*FIG. 6C*

```
115        /* run dynamic programming algorithm for all subsequent stages */
116        for (lbl_idx=1; lbl_idx<(MAX_LABEL-1); lbl_idx++) {
117            obj_func[lbl_idx, 0] = 0;
118            /* check all states */
119            for (tcam_idx=0; tcam_idx<=TOTAL_TCAM_CLIENT; tcam_idx++) {
120                cur_vmr_lbl_tcam = 0;
121                /* check the optimality equation */
122                for (vmr_idx=0;
123                     vmr_idx<=min(max_vmr_lbl[lbl_idx], tcam_idx);
124                     vmr_idx++) {
125                    tmp_stat = (acl_stat_ag[lbl_idx, vmr_idx]
126                                + obj_func[lbl_idx-1, tcam_idx-vmr_idx]);
127                    if (obj_func[lbl_idx, tcam_idx] < tmp_stat) {
128                        obj_func[lbl_idx, tcam_idx] = tmp_stat;
129                        cur_vmr_lbl_tcam = vmr_idx;
130                    }
131                }
132                /* record the path */
133                sol_lbl_tcam[lbl_idx,tcam_idx]= cur_vmr_lbl_tcam;
134            }
135        }
136
137        /*
138         * special handling for the last stage: only case where
139         * "tcam_idx = TOTAL_TCAM_CLIENT" is taken care of.
140         */
141        lbl_idx = MAX_LABEL-1;
142        obj_func[lbl_idx, 0] = 0;
143        tcam_idx = TOTAL_TCAM_CLIENT;
144        /* check the optimality equation */
145        for (vmr_idx=0;
146             vmr_idx<=min(max_vmr_lbl[lbl_idx], tcam_idx);
147             vmr_idx++) {
148            tmp_stat = (acl_stat_ag[lbl_idx, vmr_idx]
149                        + obj_func[lbl_idx-1, tcam_idx-vmr_idx]);
150            if (obj_func[lbl_idx, tcam_idx] < tmp_stat) {
151                obj_func[lbl_idxj, tcam_idx] = tmp_stat;
152                cur_vmr_lbl_tcam = vmr_idx;
153            }
154        }
155        /* record the path */
156        sol_lbl_tcam[lbl_idx,tcam_idx]= cur_vmr_lbl_tcam;
157
```

*FIG. 6D*

```
158    /* output the best placement (with maximum VMR stats) */
159    tcam_idx = TOTAL_TCAM_CLIENT;
160    for (lbl_idx=(MAX_LABEL-1); lbl_idx>=0; lbl_idx--) {
161        if (tcam_idx > 0) {
162            sol_lbl_path[lbl_idx] = sol_lbl_tcam[lbl_idx, tcam_idx];
163            tcam_idx = tcam_idx - sol_lbl_tcam[lbl_idx, tcam_idx];
164        } else {
165            sol_lbl_path[lbl_idx] = 0;
166            tcam_idx = 0;
167        }
168    }
169 }
```

| tcam_idx | obj_func[lbl_idx=0, *] | obj_func[lbl_idx=1, *] | obj_func[lbl_idx=2, *] |
|---|---|---|---|
| 0 | 0 | | |
| 1 | 100 | | |
| 2 | 300 | | |
| 3 | 600 | | |

| tcam_idx | sol_lbl_tcam[0,*] | sol_lbl_tcam[1,*] | sol_lbl_tcam[2,*] |
|---|---|---|---|
| 0 | 0 | | |
| 1 | 1 | | |
| 2 | 2 | | |
| 3 | 3 | | |

*FIG. 8A*

| tcam_idx | obj_func[lbl_idx=0, *] | obj_func[lbl_idx=1, *] | obj_func[lbl_idx=2, *] |
|---|---|---|---|
| 0 | 0 | 0 | |
| 1 | 100 | 300=max{0+100,300+0} | |
| 2 | 300 | 500=max{0+300,300+100,500+0} | |
| 3 | 600 | 600=max{0+600,300+300,500+100,600+0}* | |

\* obj_func[1,3]=max{acl_stat_ag[1,0]+obj[0,3-0], acl_stat_ag[1,1]+obj[0,3-1], acl_stat_ag[1,2]+obj[0,3-2], acl_stat_ag[1,3]+obj[0,3-3]}

| tcam_idx | sol_lbl_tcam[0,*] | sol_lbl_tcam[1,*] | sol_lbl_tcam[2,*] |
|---|---|---|---|
| 0 | 0 | 0 | |
| 1 | 1 | 1 | |
| 2 | 2 | 2 | |
| 3 | 3 | 0 | |

*FIG. 8B*

| tcam_idx | obj_func[lbl_idx=0, *] | obj_func[lbl_idx=1, *] | obj_func[lbl_idx=2, *] |
|---|---|---|---|
| 0 | 0 | 0 | |
| 1 | 100 | 300 | |
| 2 | 300 | 500 | |
| 3 | 600 | 600 | 1000* |

\* obj_func[2,3] = max{acl_stat_ag[2,0]+obj[1,3-0], acl_stat_ag[2,1]+obj[1,3-1], acl_stat_ag[2,2]+obj[1,3-2]}
= max{0+600, 500+500, 600+300}
= 1000

| tcam_idx | sol_lbl_tcam[0,*] | sol_lbl_tcam[1,*] | sol_lbl_tcam[2,*] |
|---|---|---|---|
| 0 | 0 | 0 | |
| 1 | 1 | 1 | |
| 2 | 2 | 2 | |
| 3 | 3 | 0 | 1 |

*FIG. 8C*

```
sol_lbl_path[2] = sol_lbl_tcam[2,3] = 1  (tcam_idx = 3-1 = 2)
sol_lbl_path[1] = sol_lbl_tcam[1,2] = 2  (tcam_idx = 2-2 = 0)
sol_lbl_path[0] = 0
```

EFFICIENT TCAM RESOURCE SHARING

TECHNICAL FIELD

The present disclosure relates generally to memory protection and in particular to transaction-based shared memory protection for efficient Ternary Content Addressable Memory (TCAM) resource sharing.

BACKGROUND

Packet classification is an essential function to implement many applications such as Access Control (firewall, intrusion detection, etc.), DiffServ-based QoS (marking and policing), and Traffic Redirection (policy-based routing, Web Cache Communication Protocol, etc). Due to properties such as simplicity and wire-speed lookup within deterministic throughput, TCAMs become an important building block for packet classification in high-end routers and switches.

TCAM devices have a few drawbacks when compared with other memory, including higher cost, higher power consumption, and lower density, which are caused by the circuit complexity of each cell. High power consumption increases the power supply and cooling cost, which indirectly impacts the total cost of ownership and system performance. Therefore, in recent cost and power-effective designs for routers and switches, TCAM size has been significantly reduced.

However, with smaller TCAM size, cost-effective routers and switches risk the inability to enable packet classification policies that were previously used by routers and switches with a larger TCAM size. In view of this situation, what is needed is a mechanism to efficiently allocate TCAM resources.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

A network router is a device that forwards data packets between networks. When a data packet is received, the router accesses address information contained in the packet to determine its destination and then refers to a routing table and routing policies to direct the packet. Routing policies may permit or deny packets based on various rules. Network switches operate in much the same manner and will be discussed in tandem with routers in this document.

In a switch or router, policies implemented as access control lists (ACL) are stored and referenced for incoming packets. ACLs are composed of one or more access control entries (ACE), with each ACE defining a specific permit/deny rule.

To avoid policy failure, some switches or routers redirect the packets to a Supervisor Card for pure software-based handling. For example, in a Cisco® Catalyst 6500, if the TCAM is full and customers attempt to add new ACLs, or ACEs of existing ACLs, the policy installation may fail or the ACL wilt be enforced in software on the MSFC (Multi Service Feature Cards) that runs software processes. Software processing of packets produces a significant performance penalty and results in a delayed forwarding decision in the data plane.

Many high-performance routers and switches have a modular architecture that facilitates scalability, manageability, maintainability, and performance. In a common configuration, a router or switch includes a supervisor card and one or more line cards. The line cards may be heterogeneous and may have different TCAM sizes. In addition, TCAM usage in each line card may vary significantly. To statistically increase the overall TCAM utilization rate in a router or a switch, one approach is to share the TCAM resources among the line cards and the supervisor by chaining resource-intensive devices to resource-rich devices. If a packet classification policy is too large to fit in a TCAM on a line card, part of the policy's rules can be programmed in other line cards that still have TCAM resources available. This avoids software handling and alleviates forwarding performance degradation. If a packet hits a policy but does not hit a rule entry in local TCAM, it will hit a redirect entry in local TCAM and be redirected to other designated line cards or the supervisor for extended handling.

Noticing the fact that ACEs programmed in a local TCAM may be used less than ACEs programmed in TCAM devices of other line cards or software entries in the supervisor, an approach discussed herein includes an adaptive feedback control mechanism to minimize the traffic that is passed to other line cards across the switch fabric or to the supervisor for software processing. In an embodiment, by swapping hot ACEs (those that are frequently accessed) into a local TCAM device based on recently reported ACL statistics, traffic across the switch fabric is reduced. As a result, system performance is improved by forwarding a majority of traffic using the local line card. The mechanism uses a dynamic programming-based polynomial algorithm for ACE distribution.

System Overview

The architecture choice of a switch/router depends on performance requirements, port density, cost, feature set, and other factors. Common high-end modular switches/routers consist of the following major components: a card with control-plane processor (known as Supervisor (SUP) in Cisco® products), a set of cards with forwarding engines (data-plane processor and ASICs (Application Specific Integrated Circuit)) and associated interfaces (the whole is known as a line card in many Cisco® products), and a backplane switch fabric. All line cards and SUP are connected to the backplane switch fabric.

An abstract model is described in this section. The model illustrates the constraints and requirements in placing application VMRs in both primary line card (LC) TCAM and secondary LC TCAM devices, when the primary LC TCAM capacity is not large enough to program all VMRs from applications. Each ACE may be translated into a few VMRs. An ACE is the logical unit of packet classification rules, while a VMR is the physical unit in a TCAM device.

In a line card with TCAM capacity $T_c$, suppose that applications require N (N is a natural number) sets of VMR bits to perform packet classifications, where each set of VMRs takes an unique label ID from $\{1, 2, \ldots, L\}$. To simplify the formulation, those redirect VMR entries for each label are explicitly excluded from $T_c$. Define the number of VMRs with label b to be $V_b$. Note that number $V_b$ is counted after all VMR-related processing and optimizations such as reduction (e.g., merge the VMRs' address ranges that are maskable, remove redundant or duplicate VMRs, and remove VMRs that are covered by previous VMRs) without statistics requirement and ODM (Order-Dependent Merge) have been done. Hence, the optimization is independent from previously known TCAM optimization techniques, and will benefit from advances described by those previously known TCAM optimization areas.

If the inequality $$\sum_{b=1}^{L} V_b > T_c$$

holds, it means that the capacity of the local TCAM device is not enough to program all VMRs. In this case, one approach is to redirect all non-matching traffic to another line card in the same router/switch that has a larger TCAM capacity, say, $T_p$. The original local line card is referred to as the primary LC, while the remote line card is referred to as the secondary LC. It is assumed that the interface and VLAN information of incoming traffic arriving at the primary line card will be carried across fabric to the secondary line card after redirection. In the secondary LC, the same classification functionality can be performed to redirected traffic from the primary LC. We are only interested in the case that inequality $$T_c < \sum_{b=1}^{L} V_b \leq (T_c + T_p)$$

holds. In case of $$(T_c + T_p) < \sum_{b=1}^{L} V_b,$$

it means that the router/switch does not have enough TCAM resources to program all VMRs, and that one or more policies from some applications has to be rejected.

Figure 1:
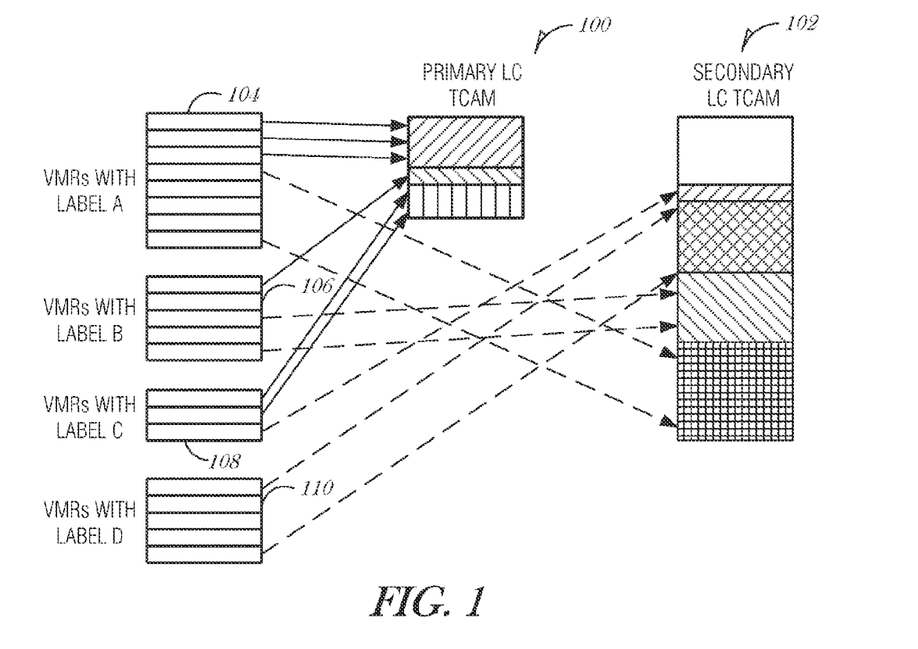
FIG. 1 is a data structure diagram illustrating an example of VMR placement across a primary line card TCAM and a second line card TCAM, according to an embodiment.

FIG. 1 is a data structure diagram illustrating an example of VMR placement across a primary line card TCAM 100 and a secondary line card TCAM 102, according to an embodiment. FIG. 1 also illustrates several groups of VMRs, organized by labels, including VMRs with Label A 104, Label B 106, Label C 108, and Label D 110. In the example shown in FIG. 1, the first three VMRs from Label A 104 are assigned to the primary line card TCAM 100, with the remaining VMRs from Label A 104 being assigned to the secondary line card TCAM 102. Other assignments are illustrated with arrows.

When key bits generated from packet header information are fed into a TCAM device, a lookup is performed in parallel for all VMRs programmed in the TCAM device. There might be multiple matches, but only one result associated with the TCAM entry with the highest priority will be returned as a hit. Without loss of generality, it is assumed that the priority is based on the order or the sequence number) of a corresponding VMR or ACE defined in the original ACL list provided by the customer. The smaller the sequence number is, the larger the priority. In the mechanism described, the order is based on the index number of VMRs programmed in a TCAM with the same label b. All TCAM entries can be identified as tuple <b, i>, where b is the label, and i is the index. For two entries <$b_1$, $i_1$> and <$b_2$, $i_2$>, if $i_1 < i_2$ holds, then entry <$b_1$, $i_1$> should be programmed as higher priority entry than entry <$b_2$, $i_2$>, and be hit first in case that key bits match both entries.

In some embodiments, it does not matter how the order is taken to program non-conflicting VMRs in TCAM. In order to simplify the formulation, it is assumed that within a VMR label, the VMR order provided by a customer should be maintained. However, pre-processing for all VMRs within the same label can be utilized to take into account optimizing non-conflicting VMRs, and maintain the validity of the formulation and approach.

From the perspective of applications, when programming a TCAM, $$\sum_{i=1}^{N} V_i$$

VMRs need to be mapped to either the TCAM in the primary LC or the TCAM in the secondary LC. For any entry <b, i>, define a decision variable $d_{b,i}$, and let $d_{b,i}$ be:

$d_{b,i} = 1$, if entry <b, i> is programmed in primary LC TCAM;

$d_{b,i} = 0$, if entry <b, i> is programmed in secondary LC TCAM.

In the case that incoming packets miss TCAM entries in primary LC TCAM 100 and hit TCAM entries in secondary LC TCAM 102, packets will have to take fabric bandwidth and CPU resources, which will degrade system performance because of the extra processing. The formulation aims to optimize the VMR placement in both TCAM devices by minimizing the cross-fabric traffic that hits VMRs programmed in the secondary LC TCAM 102 device.

The mechanism introduced in this document assigns VMR entries of each label to either primary or secondary TCAM devices based on most recent statistics of each VMR entry, which is always time-varying. In an embodiment, the statistics refer to a number of hits for a particular ACE or VMR in a given time period or over a number of packets processed. At some point, for example, after policy changes or a pre-determined larger period, the mechanism is restarted to calculate a new distribution of VMR entries for better performance.

Problem Formulation

Define the statistics for VMR entry <b, i> to be $s_{b,i}$, and then define the total statistics associated with all TCAM entries in primary LC to be $$f(d_{1,1}, \ldots, d_{L,V_L}) = \sum_{b=1}^{L} \sum_{i=1}^{V_b} (s_{b,i} \cdot d_{b,i}).$$

The optimization problem can be formulated as:

$$\text{Maximize: } f(d_{1,1}, \ldots, d_{L,V_L}) = \sum_{b=1}^{L} \sum_{i=1}^{V_b} (s_{b,i} \cdot d_{b,i}) \quad (1)$$

$$\text{Subject to: } d_{b,i} \leq d_{b,i+1}, \forall 1 \leq b \leq L \,\&\, \forall 1 \leq i \leq (V_b - 1) \quad (2)$$

$$\sum_{b=1}^{L} \sum_{i=1}^{V_b} (1 - d_{b,i}) \leq T_c \quad (3)$$

$$\sum_{b=1}^{L} \sum_{i=1}^{V_b} d_{b,i} \leq T_p \quad (4)$$

$$d_{b,i} \in \{0, 1\}, \forall 1 \leq b \leq L \,\&\, \forall 1 \leq i \leq V_b \quad (5)$$

Equation (1) is the objective function, which tries to maximize the total packets that hit the primary LC TCAM 100 device. The purpose is to avoid, as much as possible, using fabric bandwidth and CPU resources. Equation (2) is the order constraint when mapping VMRs to different TCAMs. TCAM capacity limitations in primary LC and secondary LC are captured in equations (3) and (4). Equation (5) indicates that $d_{b,i}$ is a binary decision variable. The above formulation has an integer programming format, which is generally NP-hard.

For all VMRs with the same label b, define a new parameter $g_{b,i}$ to be $$g_{b,i} = \sum_{j=1}^{i} s_{b,j},$$

which is the aggregate statistics of all VMRs that are ordered no later than current VMR <b, i>.

Further, a new decision variable $$c_b = \sum_{i=1}^{V_b} (1 - d_{b,i})$$

is introduced, which means that the first $c_b$ VMRs with label b will be programmed in the primary LC TCAM 100 device, and all remaining VMRs will be placed in the secondary LC TCAM 102 device. Now the problem can be reformulated as:

$$\text{Maximize: } f(c_1, \ldots, c_L) = \sum_{b=1}^{L} g_{b,c_b} \quad (6)$$

$$\text{Subject to: } \sum_{b=1}^{L} c_b \leq T_c \quad (7)$$

$$\sum_{b=1}^{L} (V_b - c_b) \leq T_p \quad (8)$$

$$1 \leq c_b \leq V_b, \forall 1 \leq b \leq L \quad (9)$$

With the above new formulation, the constraint expressed in Equation (2) is implicitly captured as part of new parameter $g_{b,i}$. Given the special structure of this problem, an approach that has polynomial time complexity and can guarantee the optimal solution is disclosed.

An Example Solution Based on Dynamic Programming

Firstly, define $$p(c_b) = \max_{c_1, \ldots, c_b} f(c_1, \ldots, c_b),$$

and $$q(c_b) = \sum_{j=1}^{b} c_j.$$

Now the objective function can be rewritten in a recursive way:

$$p(c_b) = \max_{c_b = T_c - q(c_{b-1})} (g_{b,c_b} + p(c_{b-1})) \quad (10)$$

Equation (10) represents the optimality equation in a dynamic programming formulation. The core idea is that the optimization over labels or policies can be regarded as an optimization in stages, and the desire to obtain the maximum profit at the current set of labels can be traded off against the implication that there might be more profits by incrementally adding more labels in future stages.

Figure 2:
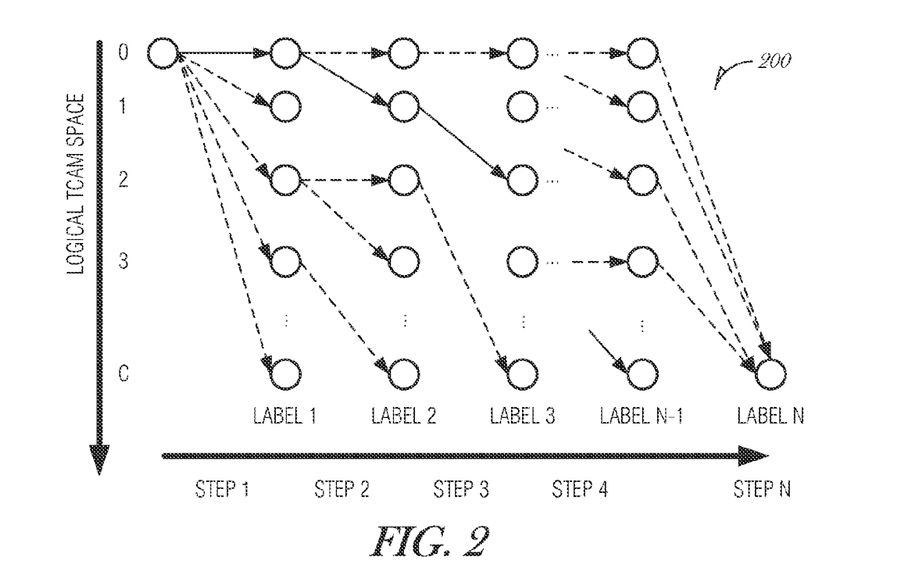
FIG. 2 is a Trellis graph illustrating a model of the problem and solution, according to an embodiment.

The problem formulated in previous section is split into a few sub-problems. Each sub-problem considers how to optimally map a set of VMRs associated with a particular label, e.g., solve decision variable $c_i$ for all label i ($0 \leq i \leq b$), as shown in FIG. 2 (the x-axis). In the sub-problem, a smaller scale of problem with a similar formulation is being worked on, and the decision variables in sub-problems do not overlap with each other. However, it is not a typical divide-and-conquer strategy, where each sub-problem is addressed independently. In the case of dynamic programming, the results of resolved sub-problems are re-used to solve a larger problem in a more efficient way by avoiding redundant optimization computations. Further, dynamic programming typically involves solving all possible sub-problems, rather than a small portion of the larger problem.

FIG. 2 is a Trellis graph 200 illustrating a model of the problem and solution, according to an embodiment. In a dynamic programming based approach, the decision (the number of VMRs to be programmed in primary LC TCAM 100) is made in a sequence, which is ordered in the label ID from the smallest to the largest. The decision for label b (b>0) only depends on the suboptimal decisions made for label b−1. During each decision stage b, the state variable is the actual number of primary LC TCAM entries that have been used to program all policies with label no more than b. In a feasible solution path, the number of used TCAM entries should be strictly non-decreasing. As a result, in the Trellis graph 200, all transition edges to the next decision stage will never point to states that have fewer TCAM entries. The metric associated with edges is the cumulative statistics of the first few VMR entries with the same label.

In the case that two TCAM devices are chained, to reduce the amount of cross-fabric traffic and improve the overall forwarding performance, an efficient polynomial time algorithm based on dynamic programming is presented to program a set of policies destined for the primary line card.

An example is provided to illustrate how the mechanism works. Note that the secondary TCAM device may be generalized to include a software module that performs packet classification. The optimization is independent from previously known TCAM optimization techniques such as Redundancy Elimination and Order-Dependent Merging, and it will benefit from all advances in those previously known TCAM optimization areas.

Example Embodiments

Figure 3:
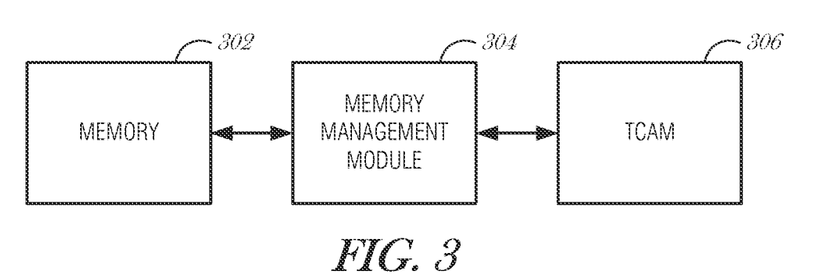
FIG. 3 is a block diagram illustrating a system, according to an embodiment.

FIG. 3 is a block diagram illustrating a system 300 according to an embodiment. The system 300 includes memory 302, a memory management module 304, and a TCAM 306. The memory 302 may store data related to access control lists (ACL) and access control entries (ACE) in the form of value-mask-result tuples (VMR) and grouped by VMR labels.

The memory management module 304 includes hardware and/or software capable of reading and writing to the memory 302. The memory management module 304 may include user level libraries, operating system routines, such as those that may exist in hardware abstraction layers, or other software constructs that access memory. The memory management module 304 may also optionally refer to hardware devices that access, manage, or control memory.

In an embodiment, the memory management module 304 operates to process data stored in the memory 302 and obtain a result set of VMRs to store in the TCAM 306.

Figure 4:
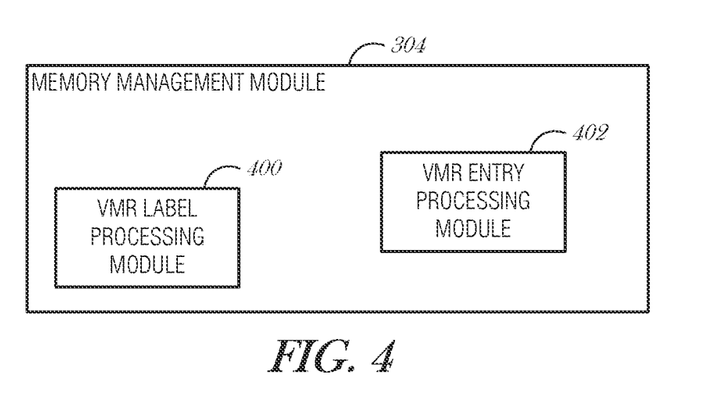
FIG. 4 is a block diagram illustrating modules of a memory management module, according to an embodiment.

FIG. 4 is a block diagram illustrating modules of a memory management module 304, according to an embodiment. As shown in FIG. 4, there is a VMR label processing module 400 and a VMR entry processing module 402. The VMR label processing module 400 may be configured to sequentially access a plurality of groups of VMR entries, each group having at least one VMR entry associated with the group. The VMR entry processing module 402 may be configured to iteratively analyze the VMR entries associated with each group to determine a result set of VMR entries, the result set being a subset of VMR entries from the plurality of groups of VMR entries, and the result set to be stored in the primary TCAM. In addition, the modules 400 and 402 may be configured to perform the operations discussed in the flowcharts below.

Figure 5:
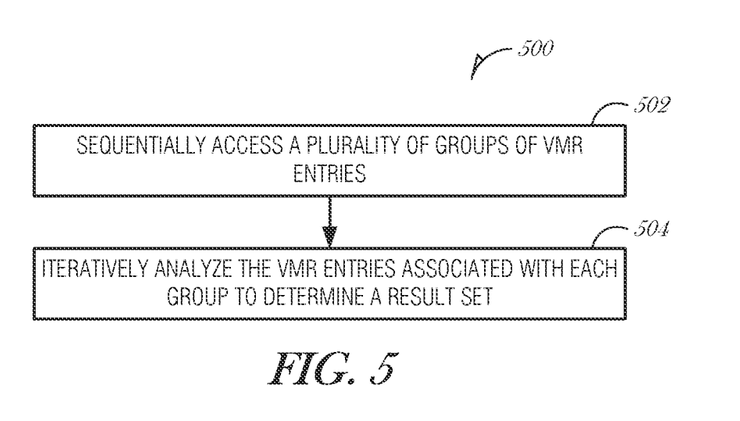
FIG. 5 is a flowchart illustrating a general form of a mechanism for allocating entries across a plurality of TCAMs, according to an embodiment.

FIG. 5 is a flowchart illustrating a method 500 for allocating entries across a plurality of TCAMs, according to an embodiment. In an embodiment, the plurality of TCAMs includes a primary TCAM and a secondary TCAM. At block 502, a plurality of groups of VMR entries are sequentially accessed, with each group having at least one VMR entry associated with the group. In an embodiment, the plurality of groups of VMR entries is organized by a corresponding plurality of VMR labels.

At block 504, the VMR entries associated with each group are iteratively analyzed to determine a result set of VMR entries using a computing device, the result set being a subset of VMR entries from the plurality of groups of VMR entries, and the result set to be stored in the primary TCAM.

In an embodiment, each VMR entry is associated with a value. In such an embodiment, iteratively analyzing the VMR entries is performed by identifying a number of available VMR entries of the primary TCAM and maximizing an aggregate value of VMR entries for the result set, with the result set having a number of VMR entries equal to the number of available VMR entries of the primary TCAM.

In a further embodiment, maximizing the aggregate value of VMR entries for the result set is performed by identifying an aggregate value of a previously-analyzed VMR entry of a first group. In addition, a local aggregate value associated with a VMR entry under analysis from a second group is identified. A temporary value is calculated by summing the local aggregate value associated with the VMR entry under analysis and the aggregate value of the previously-analyzed VMR entry. The temporary value is maximized over the VMRs in the second group.

In a further embodiment, a VMR entry from the second group that maximized the temporary value over the VMRs in the second group is identified. Then, in a path variable, an indication of the VMR entry from the second group that maximized the temporary value over the VMRs in the second group is stored.

In a further embodiment, the path variable is processed to obtain the VMR entries for the result set.

In an embodiment, the plurality of the groups of VMR entries include a first processed group and a last processed group, and wherein the first processed group and the last processed group include VMR entries in a list. In such an embodiment, the method 500 includes the operations of initializing an aggregate value of each VMR entry in the first processed group to the sum of a value of a VMR entry from the list and values of zero or more VMR entries earlier in the list.

While FIG. 5 includes a general mechanism to allocate or assign VMRs to TCAMs, FIGS. 6A-E depict pseudocode listings illustrating a specific mechanism to efficiently assign entries to TCAMs, according to an embodiment.

Besides system parameters such as TCAM capacity in primary LC, the input arguments of function cal_optimal_vmr_placement ( ) are the number of labels or policies (MAX_LABEL), the number of VMRs required for each label (max_vmr_lbl [ ]), and the ACL statistics (packet count) of each VMR for all labels. The output argument of function cal_optimal_vmr_placement ( ) is the number of VMRs that will be programmed in TCAM device of primary LC (sol_lbl_path [ ]).

Figure 6A:
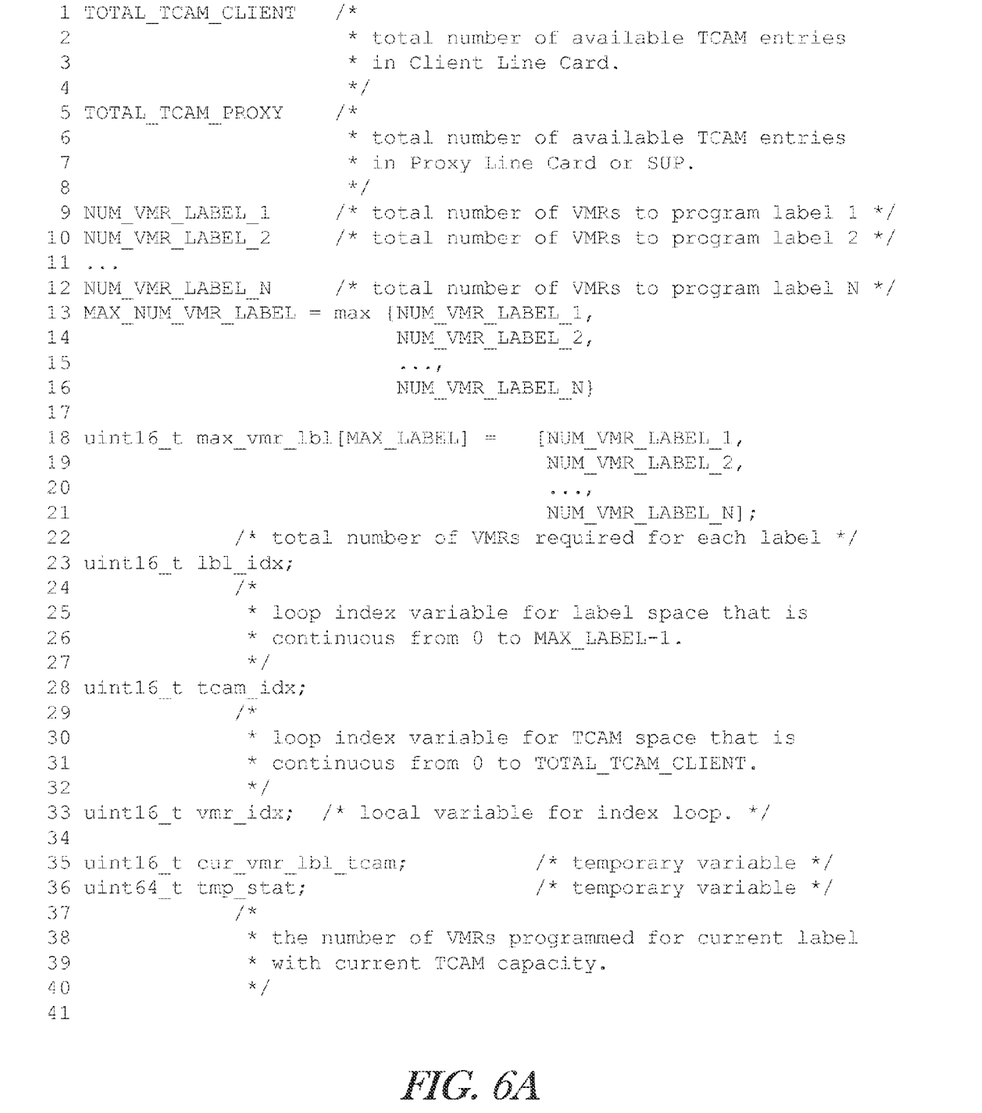
FIGS. 6A-E are pseudocode listings illustrating a mechanism to efficiently assign entries to TCAMs, according to an embodiment.
Figure 6B:
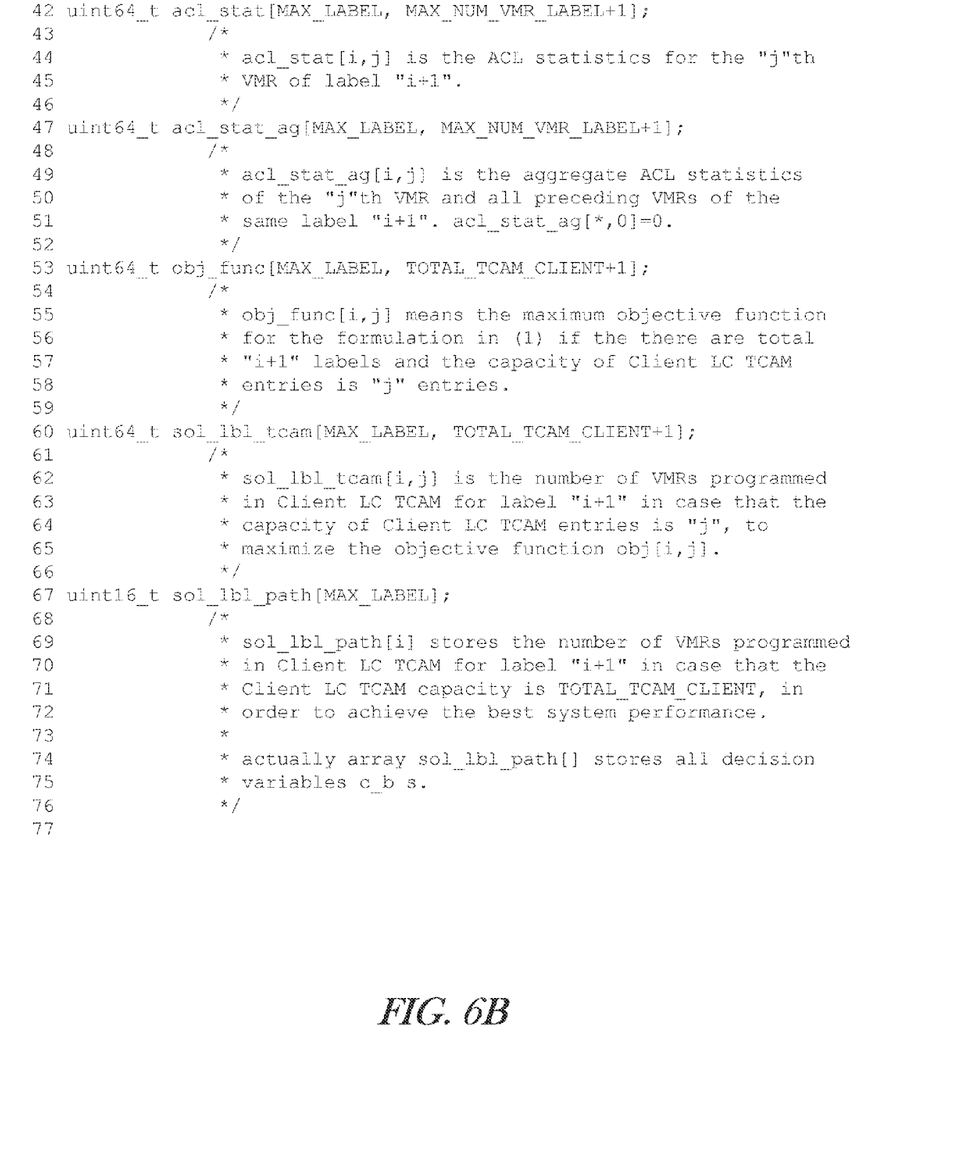
Figure 6C:
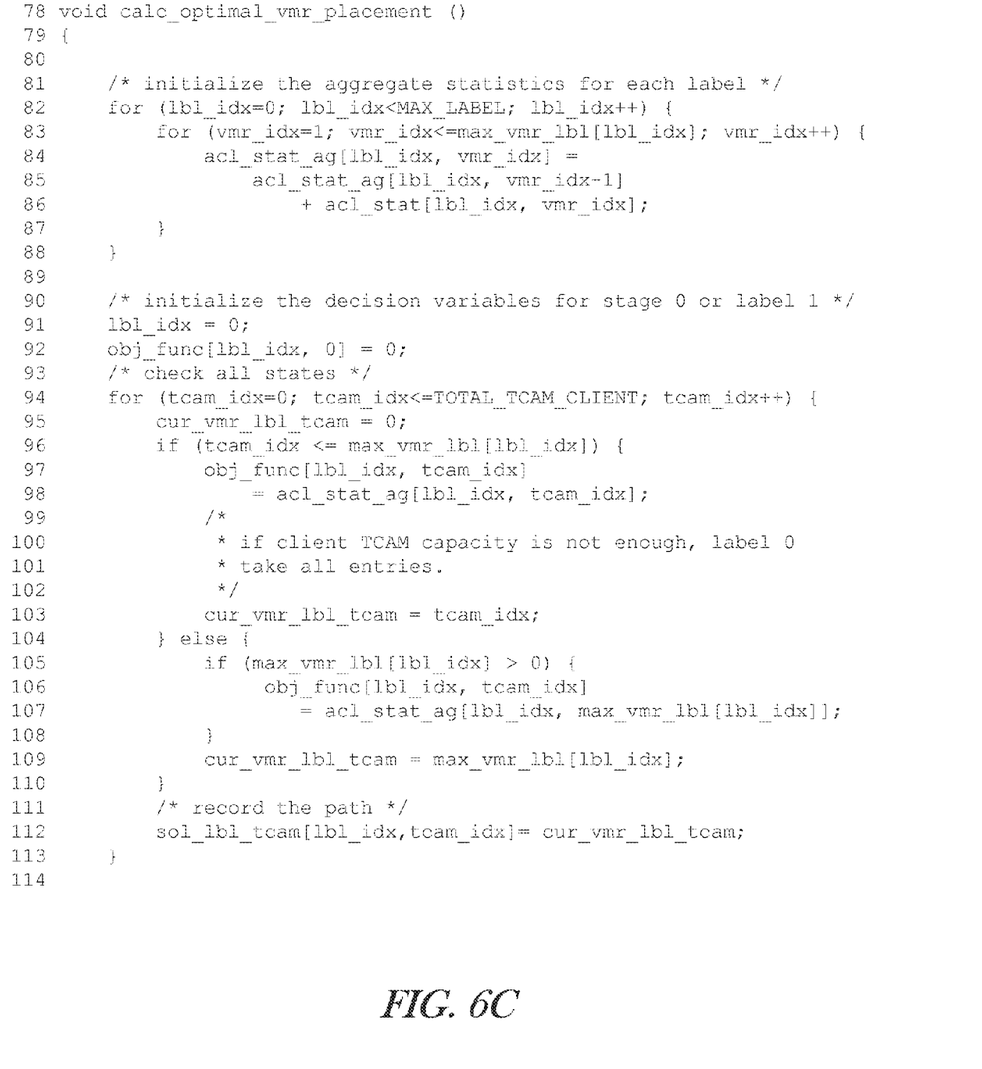
Figure 6D:
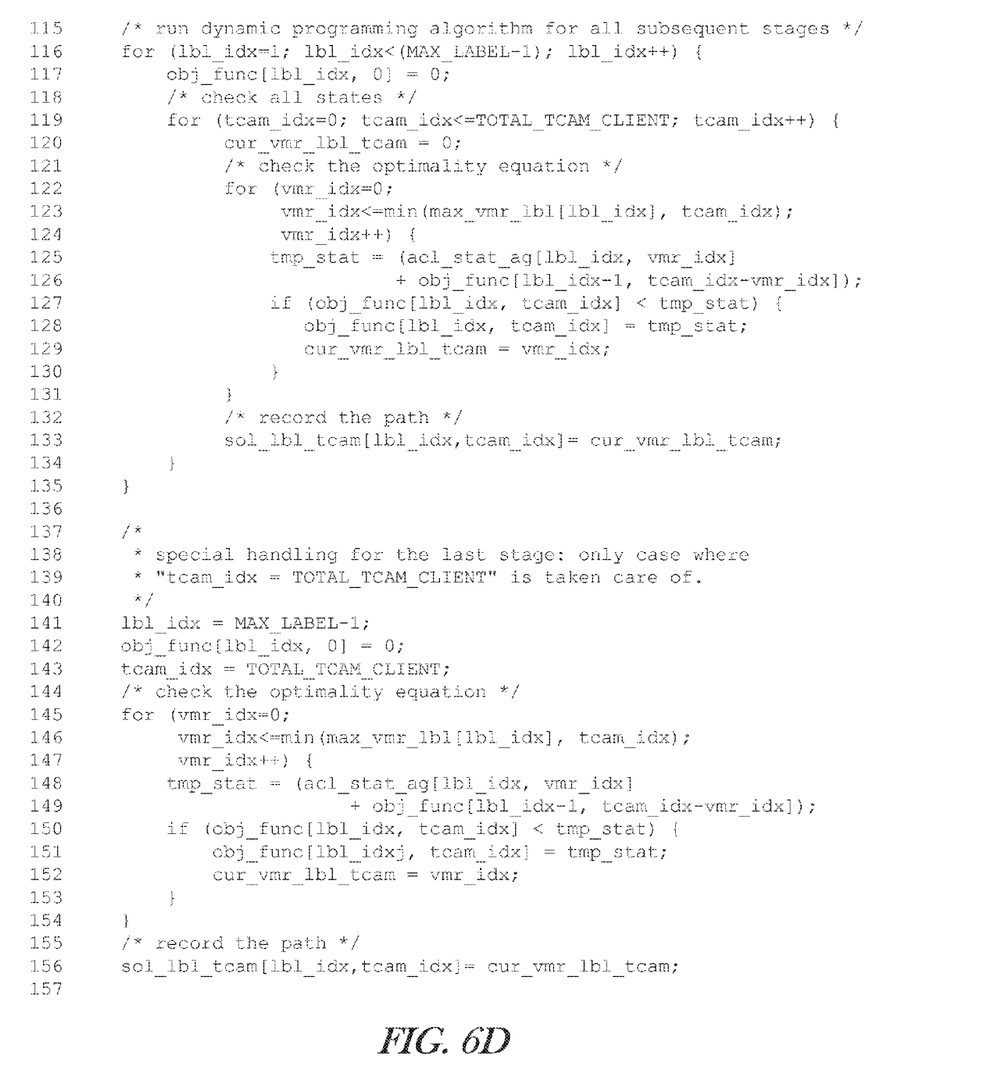

Lines 81-88 initialize the array of cumulative statistics for a label, e.g., parameter $g_{b,j}$ formulated in the optimality equation, based on most recent individual statistics of each VMR. From line 90 to line 135, an iterative process is performed by adding a new label in each stage to implement the recursive procedure, where the optimality equation of dynamic programming is enforced in lines 122-131.

In the last stage, there is one minor optimization where only the state of the full TCAM usage in primary LC needs to be addressed. As a result, from lines 137-154, the optimality equation is being checked only for one state. Since the assumption is that there is not enough TCAM capacity in primary LC to program all labels, it is guaranteed that there is only one state in the last stage of dynamic programming.

Figure 6E:
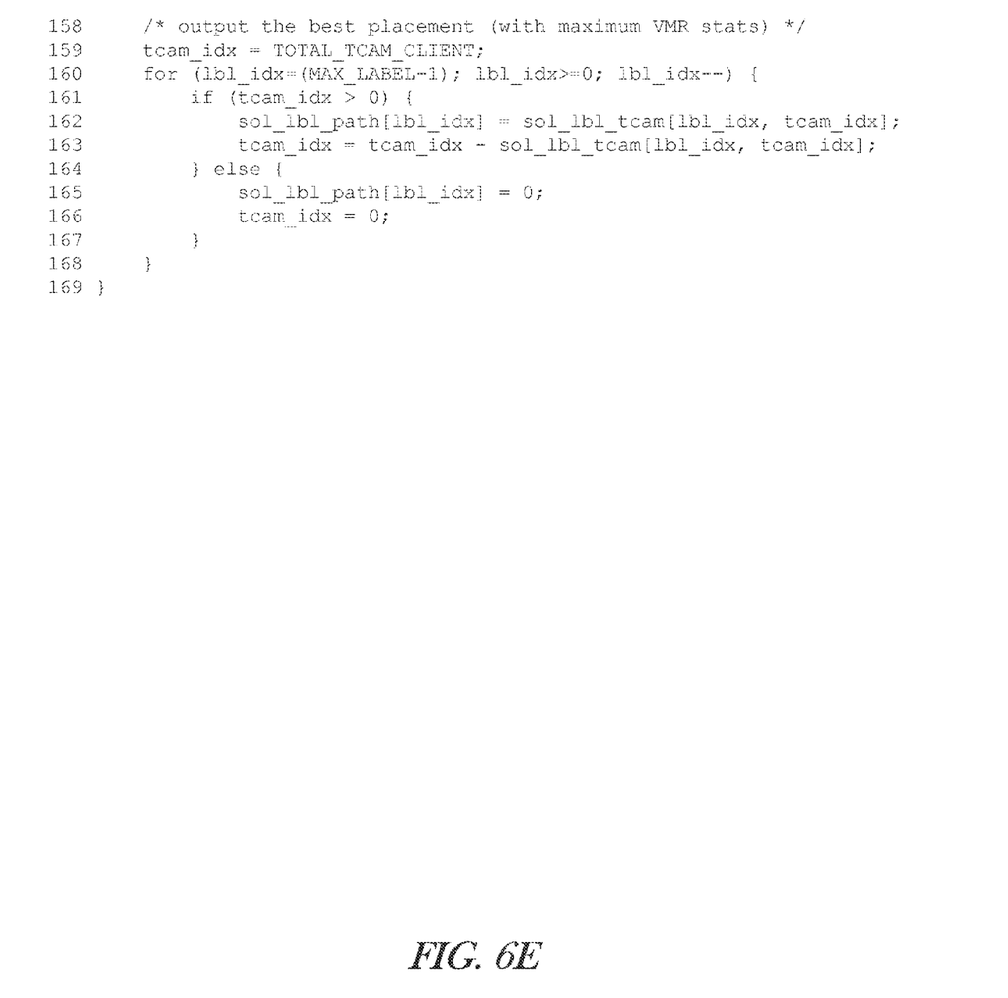

From lines 158-168, the values of all decision variables are back tracked, and stored in the output argument.

Note that coarser VMR granularity will certainly reduce both computation and storage costs. One approach is to group consecutive VMRs into a logical VMR by adding the statistics of the VMRs in the group. The aggregate logical VMRs will be involved in calculating the placement. For example, if TOTAL_TCAM_PROXY+TOTAL_TCAM_CLIENT is 64K and every 8 consecutive entries are grouped together, then the process only needs to handle 64K/8=8K logical entries.

Figure 7:
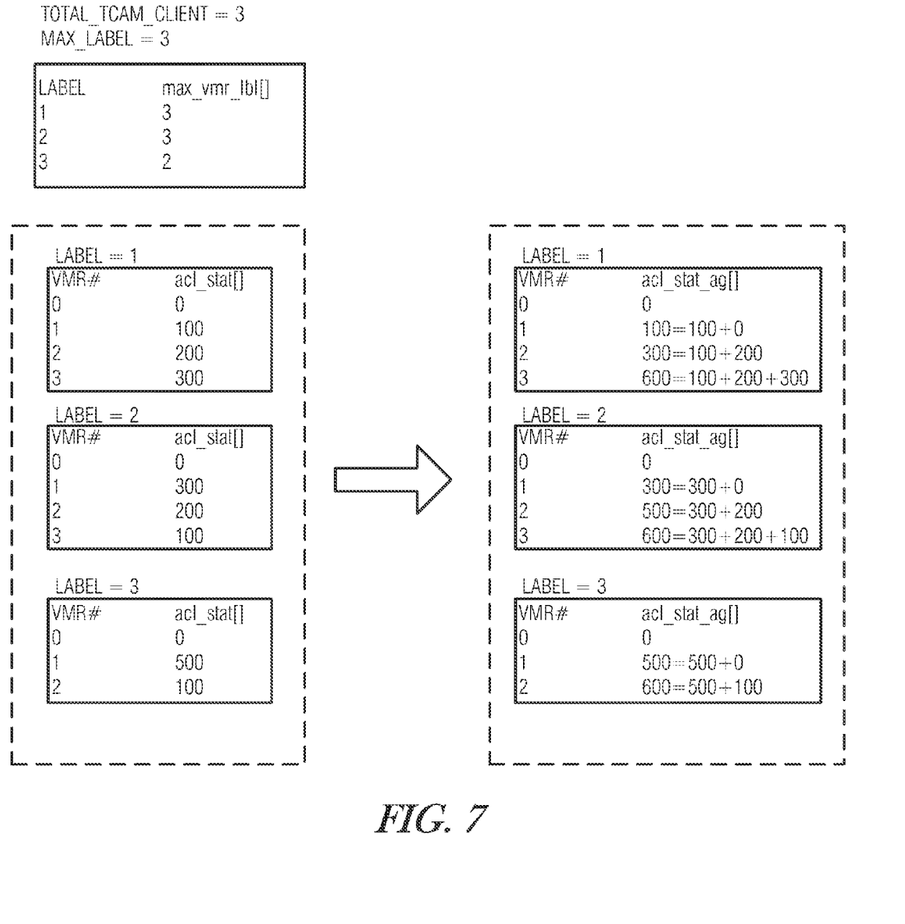
FIG. 7 is a block diagram illustrating an initial stage of processing, according to an embodiment.
Figure 8A:
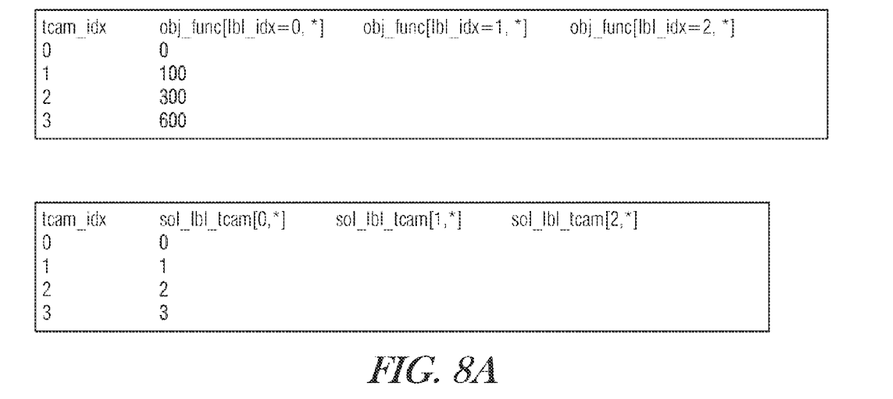
FIGS. 8A-D are block diagrams illustrating later stages of processing, according to an embodiment.
Figure 8B:
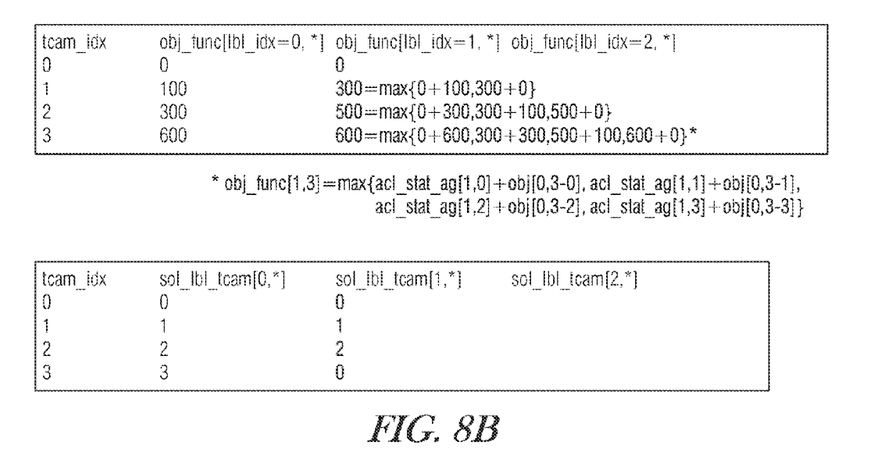

FIGS. 7 and 8A-B provide illustration for an example VMR placement, according to an embodiment. This section provides an illustrative example with a small size VMR placement problem. Computations can be scaled to a larger size problem. FIG. 7 is a block diagram illustrating an initial stage of processing, according to an embodiment. In FIG. 7, the input parameters and arguments are illustrated, and the aggregate statistics for each VMR entry is calculated. This corresponds with lines 81-88 of the pseudocode in FIG. 6C.

FIGS. 8A-D are diagrams illustrating later stages of processing, according to an embodiment. In particular, FIG. 8A illustrates the calculation during the initial stage of dynamic programming. During this phase, aggregated values are used to populate the objective function array obj_func [ ] for the first label processed (Label 1). This corresponds with lines 90-113 of the pseudocode in FIG. 6C.

FIG. 8B illustrates the iterative steps from line 115 to line 135 of the pseudocode in FIG. 6D. Note that there are two candidates of solutions for obj_func[lbl_idx=1, tcam_idx=3]. From line 127 in the pseudocode, the one that comes with fewer VMRs of the current label is chosen.

Figure 8C:
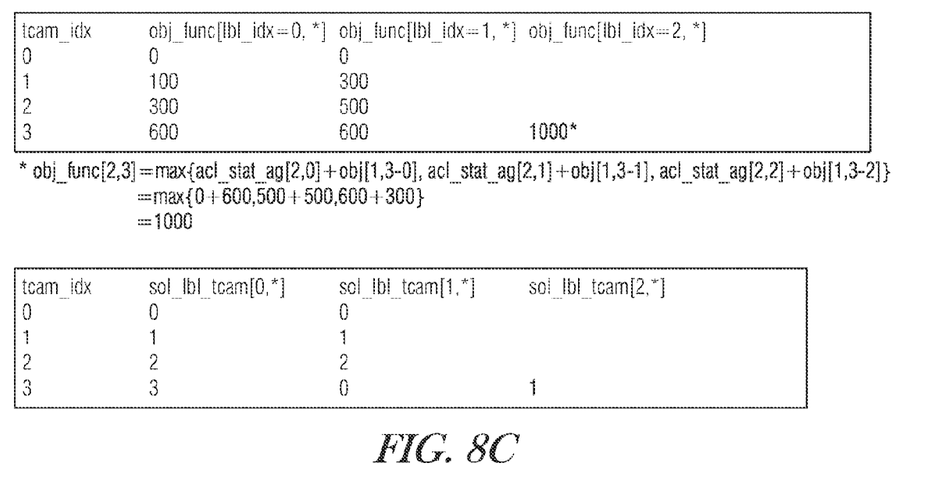

FIG. 8C illustrates the last stage of dynamic programming, where only the solution with state "tcam_idx=TOTAL_TCAM_CLIENT" is needed. The decision variables are also given in array sol_lbl_path [ ]. This corresponds with lines 138-154 of the pseudocode in FIG. 6D.

Figure 8D:
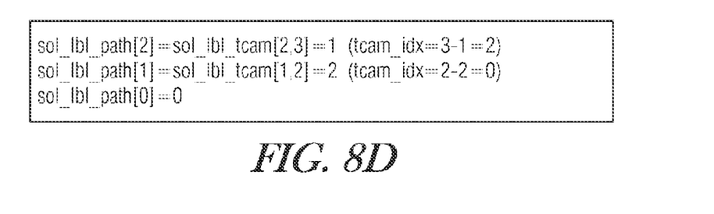

FIG. 8D illustrates the solution for the example. The final result shows that programming the first VMR of Label 3 and the first two VMRs of Label 2 and in primary LC TCAM device will lead to the best forwarding performance, e.g., 1000 out of 1800 packets will be forwarded without crossing the fabric. This corresponds with lines 158-168 of the pseudocode in FIG. 6E.

Hardware Platform

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Figure 9:
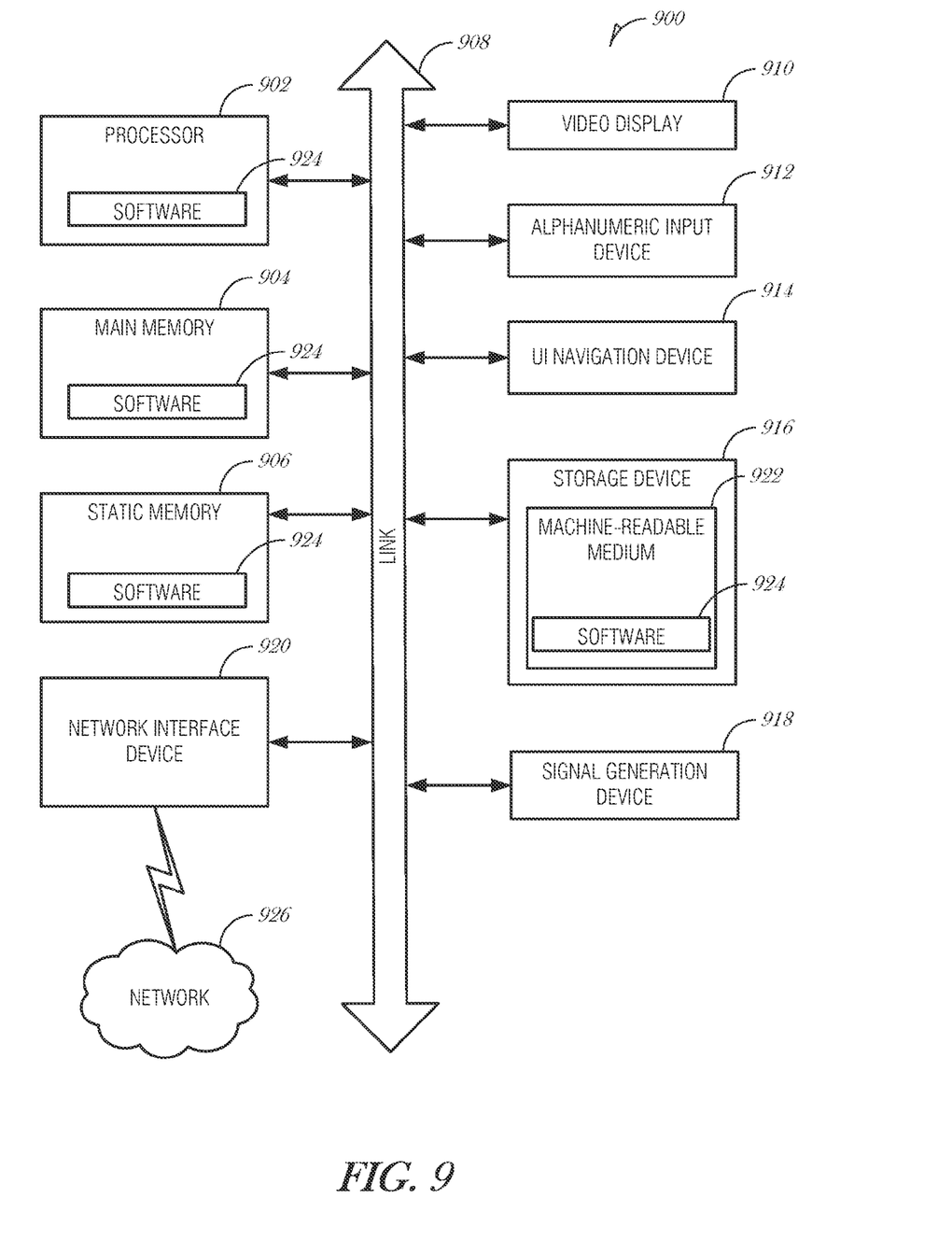
FIG. 9 is a block diagram illustrating a machine in the example form of a computer system, within which a set or sequence of instructions may be executed to cause the machine to perform any one of the methodologies discussed herein, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g, bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although embodiments have been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A non-transitory machine-readable medium comprising instructions for allocating entries across a plurality of ternary content addressable memories (TCAMs), the plurality of TCAMs including a primary TCAM and a secondary TCAM, wherein the primary TCAM is provided in a first line card and the secondary TCAM is provided in a second line card, the instructions when executed on a computing device, cause the computing device to:
    sequentially access a plurality of groups of value-mask-result (VMR) entries, each group having at least one VMR entry associated with the group, and each VMR entry being a physical unit on a TCAM device that corresponds to an access control entry (ACE) of an access control list (ACL);
    iteratively analyze the VMR entries associated with each group based on statistics of usage of each of the VMR entries;
    determine a result set of VMR entries from the iteratively analyzing, the result set being a subset of VMR entries from the plurality of groups of VMR entries that are most frequently accessed for packet forwarding decisions;
    store the VMR entries that are most frequently accessed for packet forwarding decisions in the primary TCAM of the first line card in response to determining the result set;
    store remaining VMR entries not stored in the primary TCAM of the first line card in the secondary TCAM of the second line card, and
    store VMR redirect rules in the primary TCAM to redirect traffic that does not match at least one of the most frequently accessed VMR entries in the primary TCAM from the primary TCAM of the first line card to the secondary TCAM of the second line card.

2. The non-transitory machine-readable medium of claim 1, wherein each VMR entry is associated with a value, and wherein the instructions to iteratively analyze the VMR entries comprise instructions to:
    identify a number of available VMR entries of the primary TCAM;
    assign a statistic value to each VMR entry; and
    maximize an aggregate statistics value of VMR entries for the result set, the result set having a number of VMR entries equal to the number of available VMR entries of the primary TCAM.

3. The non-transitory machine-readable medium of claim 2, wherein the instructions to maximize the aggregate statistics value of VMR entries for the result set comprise instructions to:
    assign each VMR entry in each group with an index number, and wherein index numbers for VMR entries are organized in an increasing order in each group,
    select a first group of VMR entries to generate the result set of VMR entries based on statistics of usage of each of the VMR entries;
    calculate a running aggregate statistics value associated with each entry of the first group;
    select a second group of VMR entries to be put into the result set of VMR entries based on statistics of usage of each of the VMR entries;
    identify a local aggregate statistics value associated with a VMR entry under analysis from the second group;
    calculate a plurality of running aggregate statistics values associated with the result set of VMR entries based on statistics of usage of each of the VMR entries; and
    maximize the running aggregate statistics value associated with the result set of VMR entries based on statistics of usage of each of the VMR entries.

4. The non-transitory machine-readable medium of claim 3, comprising instructions to:
    identify a VMR entry from the second group that maximized the running aggregate statistics value associated with the result set of VMR entries based on statistics of usage of each of the VMR entries; and store in a path variable, an indication of the VMR entry from the second group that maximized the running aggregate statistics value associated with the result set of VMR entries based on statistics of usage of each of the VMR entries; and process the path variable to obtain the VMR entries for the result set of VMR entries based on statistics of usage of each of the VMR entries.

5. The non-transitory machine-readable medium of claim 1, wherein the result set of VMR entries is determined by dynamic programming.

6. The non-transitory machine-readable medium of claim 5, further comprising instruction to:

group consecutive VMRs into logical VMRs;

compute aggregate statistics values for each logical VMR; and determine the result set of VMR entries based on statistics of usage of each of the logical VMRs by dynamic programming.

7. The non-transitory machine-readable medium of claim 1, comprising instructions to:

receive a packet at the first line card;

perform a look-up in the primary TCAM for VMR entries stored in the primary TCAM that apply to the packet;

locate, in response to the look-up, a VMR redirect rule to forward the packet to the second line card; and forward the packet to the second line card for application of the remaining VMR entries stored in the secondary TCAM to the packet.

8. A method for allocating entries across a plurality of ternary content addressable memories (TCAMs), the plurality of TCAMs including a primary TCAM and a secondary TCAM, wherein the primary TCAM is provided in a first line card and the secondary TCAM is provided in a second line card, the method comprising:

sequentially accessing a plurality of groups of value-mask-result (VMR) entries, each group having at least one VMR entry associated with the group, and each VMR entry being a physical unit on a TCAM device that corresponds to an access control entry (ACE) of an access control list (ACL); and iteratively analyzing the VMR entries associated with each group based on statistics of usage of each of the VMR entries using a computing device;

determining a result set of VMR entries from the iteratively analyzing, the result set being a subset of VMR entries from the plurality of groups of VMR entries that are most frequently accessed for packet forwarding decisions;

storing the VMR entries that are most frequently accessed for packet forwarding decisions in the primary TCAM of the first line card in response to determining the result set;

storing remaining VMR entries not stored in the primary TCAM in the secondary TCAM of the second line card; and storing VMR redirect rules in the primary TCAM to redirect traffic that does not match at least one of the most frequently accessed VMR entries in the primary TCAM of the first line card from the primary TCAM of the first line card to the secondary TCAM of the second line card.

9. The method of claim 8, wherein each VMR entry is associated with a value, and wherein iteratively analyzing the VMR entries comprises:

identifying a number of available VMR entries of the primary TCAM;

assigning a statistic value to each VMR entry; and maximizing an aggregate statistics value of VMR entries for the result set, the result set having a number of VMR entries equal to the number of available VMR entries of the primary TCAM.

10. The method of claim 9, wherein maximizing the aggregate statistics value of VMR entries for the result set comprises:

assigning each VMR entry in each group with an index number, and wherein index numbers for VMR entries are organized in an increasing order in each group, selecting a first group of VMR entries to generate the result set of VMR entries based on statistics of usage of each of the VMR entries;

calculating a running aggregate statistics value associated with each entry of the first group;

selecting a second group of VMR entries to be put into the result set of VMR entries based on statistics of usage of each of the VMR entries;

identifying a local aggregate statistics value associated with a VMR entry under analysis from the second group;

calculating a plurality of running aggregate statistics values associated with the result set of VMR entries based on statistics of usage of each of the VMR entries; and maximizing the running aggregate statistics value associated with the result set of VMR entries based on statistics of usage of each of the VMR entries.

11. The method of claim 10, comprising:

identifying a VMR entry from the second group that maximized the running aggregate statistics value associated with the result set of VMR entries based on statistics of usage of each of the VMR entries;

storing in a path variable, an indication of the VMR entry from the second group that maximized the running aggregate statistics value associated with the result set of VMR entries based on statistics of usage of each of the VMR entries; and processing the path variable to obtain the VMR entries for the result set of VMR entries based on statistics of usage of each of the VMR entries.

12. The method of claim 8, wherein the result set of VMR entries is determined by dynamic programming.

13. The method of claim 12, further comprising:

grouping consecutive VMRs into logical VMRs;

computing aggregate statistics values for each logical VMR; and determining the result set of VMR entries based on statistics of usage of each of the logical VMRs by dynamic programming.

14. The method of claim 8, further comprising:

receiving a packet at the first line card;

performing a look-up in the primary TCAM for VMR entries stored in the primary TCAM that apply to the packet;

locating, in response to the look-up, a VMR redirect rule to forward the packet to the second line card; and forwarding the packet to the second line card for application of remaining VMR entries stored in the secondary TCAM to the packet.

15. A computing system configured for allocating entries across a plurality of ternary content addressable memories (TCAMs), the plurality of TCAMs including a primary TCAM and a secondary TCAM, wherein the primary TCAM is provided in a first line card and the secondary TCAM is provided in a second line card, the computing system comprising:
   a computing processor; and
   a memory to hold instructions, which when executed by the computing processor, cause the computing processor to:
      sequentially access a plurality of groups of value-mask-result (VMR) entries, each group having at least one VMR entry associated with the group, and each VMR entry being a physical unit on a TCAM device that corresponds to an access control entry (ACE) of an access control list (ACL);
      iteratively analyze the VMR entries associated with each group based on statistics of usage of each of the VMR entries;
      determine a result set in response to the iteratively analyzing, the result set being a subset of VMR entries from the plurality of groups of VMR entries that are most frequently accessed for packet forwarding decisions;
      store the VMR entries that are most frequently accessed for packet forwarding decisions in the primary TCAM of the first line card in response to determining the result set; and
      store remaining VMR entries not stored in the primary TCAM in the secondary TCAM of the second line card; and
      store VMR redirect rules in the primary TCAM to redirect traffic that does not match at least one of the most frequently accessed VMR entries in the primary TCAM from the primary TCAM of the first line card to the secondary TCAM of the second line card.

16. The computing system of claim 15, wherein each VMR entry is associated with a value, and wherein the instructions to iteratively analyze the VMR entries comprise instructions to:
   identify a number of available VMR entries of the primary TCAM;
   assign a statistic value to each VMR entry; and
   maximize an aggregate statistics value of VMR entries for the result set, the result set having a number of VMR entries equal to the number of available VMR entries of the primary TCAM.

17. The computing system of claim 16, wherein the instructions to maximize the aggregate statistics value of VMR entries for the result set comprise instructions to:
   assign each VMR entry in each group with an index number, and wherein index numbers for VMR entries are organized in an increasing order in each group,
   select a first group of VMR entries to generate the result set of VMR entries based on statistics of usage of each of the VMR entries;
   calculate a running aggregate statistics value associated with each entry of the first group;
   select a second group of VMR entries to be put into the result set of VMR entries based on statistics of usage of each of the VMR entries;
   identify a local aggregate statistics value associated with a VMR entry under analysis from the second group;
   calculate a plurality of running aggregate statistics values associated with the result set of VMR entries based on statistics of usage of each of the VMR entries; and
   maximize the running aggregate statistics value associated with the result set of VMR entries based on statistics of usage of each of the VMR entries.

18. The computing system of claim 17, the instructions further comprise instructions to:
   identify a VMR entry from the second group that maximized the running aggregate statistics value associated with the result set of VMR entries based on statistics of usage of each of the VMR entries;
   store in a path variable, an indication of the VMR entry from the second group that maximized the running aggregate statistics value associated with the result set of VMR entries based on statistics of usage of each of the VMR entries; and
   process the path variable to obtain the VMR entries for the result set of VMR entries based on statistics of usage of each of the VMR entries.

19. The computing system of claim 15, wherein the result set of VMR entries is determined by dynamic programming.

20. The computing system of claim 19, wherein the instructions further comprise instructions to:
   group consecutive VMRs into logical VMRs;
   compute aggregate statistics values for each logical VMR; and
   determine the result set of VMR entries based on statistics of usage of each of the logical VMRs by dynamic programming.

21. The computing system of claim 15, wherein the instructions further comprise instructions that cause the computing processor to:
   receive a packet at the first line card;
   perform a look-up in the primary TCAM for VMR entries stored in the primary TCAM that apply to the packet;
   locate, in response to the look-up, a VMR redirect rule to forward the packet to the second line card; and
   forward the packet to the second line card for application of the remaining VMR entries stored in the secondary TCAM to the packet.

* * * * *